2,794,048
2-AMINOMETHYL-INDANE COMPOUNDS

Helmer Richter, Berlin-Grunewald, and Martin Schenck, Berlin-Frohnau, Germany, assignors to Firma Schering A. G., Berlin, Germany No Drawing. Application December 7, 1954, Serial No. 473,728

Claims priority, application Germany December 12, 1953

2 Claims. (Cl. 260—570.9)

The present invention relates to new 2-aminomethyl-indane compounds and to methods of producing the same.

It is an object of the present invention to provide new 2-aminomethyl-indane compounds which have important pharmacological properties.

It is another object of the present invention to provide methods of producing the new 2-aminomethyl-indane compounds of the present invention.

Other objects and advantages of the present invention will be apparent from a further reading of the specification and of the appended claims.

With the above objects in view, the present invention mainly comprises as a new composition of matter, a 2-aminomethyl-indane having the following structural formula:

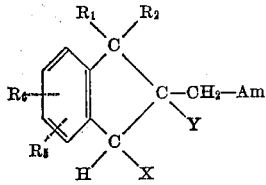

wherein $R_1$ is selected from the group consisting of alkyl and aryl radicals, wherein $R_2$ is selected from the group consisting of hydrogen and alkyl radicals, wherein Am is selected from the group consisting of the amino group, mono-substituted amino groups substituted by alkyl radicals, di-substituted amino groups substituted by alkyl radicals, and heterocyclic nitrogen-containing radicals linked to the methyl group of the N atom; wherein $R_5$ and $R_6$ are each connected to a different carbon atom in the benzene ring and each is selected from the group consisting of hydrogen and radicals capable of substituting for the hydrogen atom and onto the carbon atom of the benzene ring, and wherein X by itself represents a radical selected from the group consisting of hydrogen and hydroxyl radicals, Y by itself represents hydrogen and X and Y together represent a double bond between carbon atoms 2 and 3 of the indane system.

The structural formula of the compounds of the present invention may also be written as follows:

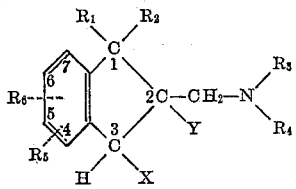

wherein $R_1$, $R_2$, $R_5$, $R_6$, X and Y have the same definitions as above and wherein $R_3$ and $R_4$ are either hydrogen or alkyl radicals or $R_3$ and $R_4$ together with the N atom form a heterocyclic ring radical such as pyrrolidyl, piperidyl or morpholinyl.

$R_1$ may be an alkyl radical such as methyl, ethyl, propyl, butyl, isopropyl, amyl and the like or an aryl radical such as phenyl, tolyl, xylyl and the like. $R_2$ is either hydrogen or an alkyl radical such as methyl, ethyl, propyl, butyl, amyl and the like.

$R_3$ and $R_4$ may be hydrogen or an alkyl radical such as methyl, ethyl, propyl, butyl, amyl and the like, or, as stated above, $R_3$ and $R_4$ together with the N atom may be a heterocyclic ring radical. Thus, Am includes among the suitable groups represented thereby, the amino group, monoalkyl amino groups such as methylamino, ethylamino, propylamino, isopropylamino and butylamino; secondary amino groups such as dimethylamino, diethylamino, di-n-propylamino, diisopropylamino, dibutylamino or mixed dialkylamino groups such as the methylethylamino, ethylpropylamino, methylbutylamino, and the like; and heterocyclic nitrogen-containing radicals such as pyrrolidino, piperidino, morpholino, oxazolidino, thiazolidino, piperazino and the like.

$R_5$ and $R_6$ which are each substituted on a different carbon atom in the benzol ring of the indane system may be either hydrogen or a normal substituent for hydrogen such as an alkyl group, e. g. methyl, ethyl, propyl, butyl, amyl and the like or an alkoxyl group such as methyloxy, ethyloxy, propyloxy and the like.

In addition to providing the new group of chemical compounds herein specified, the present invention also provides methods of producing the same. As will be seen, although all of the compounds mentioned may be separated as such, it is more feasible to separate their acid addition salts such as the hydrochloride addition product of the compound rather than the pure compound itself, which acid addition product may be used per se if derived from a non-toxic acid or, if not, may be further treated to obtain the pure product. The present invention mainly comprises not only the above-specified compounds but also their acid addition products, preferably the addition products with non-toxic acids.

The product of the present invention may be produced starting with a 2-aminoethyl-indanone-(3) having the following structural formula:

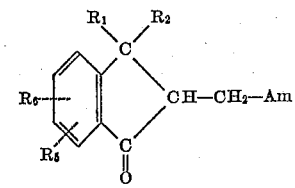

wherein the substituents $R_1$, $R_2$, Am, $R_5$ and $R_6$ have the same definitions as above. This substance is treated with a reducing agent, e. g. hydrogen utilizing Raney nickel as catalyst, to produce the corresponding 2-aminomethyl-indanole-(3). If an oxygen-free final product is desired, the indanol may be further treated with a dehydrating agent.

The reduction of the 3-keto group to the secondary hydroxyl group is preferably carried out by means of catalytic hydrogenation utilizing a noble metal catalyst or Raney nickel catalyst, the reduction preferably being carried out in an organic solvent such as methanol. The reaction proceeds without difficulty and product obtained is the new 2-aminomethyl-indanol-(3) of the present invention having the following structural formula:

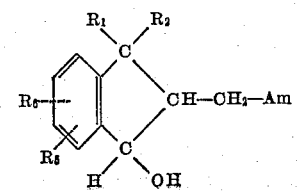

wherein the substituents $R_1$, $R_2$, Am, $R_5$ and $R_6$ have the same definitions as above.

This compound has interesting pharmacological properties as compared to the starting material. Thus for example the 1-phenyl-2-dimethylamino-indanol-(3)-hydrochloride shows a strong central nervous system stimulant action, particularly an analeptic action, without any side action on the sympathetic nervous system. These pharmaceutically valuable properties of the new 2-aminomethyl-indanol-(3) of the present invention could not be predicted and is in fact completely unexpected in view of the writings of K. Hoffmann and H. Schellenberg (Helv. Chim. Acta, volume 27, page 1784) wherein it was shown that the known 2-aminomethyl-indanol-1) is pharmacologically completely uninteresting.

Not only do the new 2-aminomethyl-indanol-(3) compounds of the present invention possess interesting pharmacological properties, but we have found that even with limited chemical changes in the molecule thereof, the resulting products still have interesting pharmacological properties. Thus, the treatment of the 2-aminomethyl-indanol-(3) with a water splitting-off agent such as hydrochloric acid and glacial acetic acid, or Lucas reagent (zinc chloride-hydrochloric acid) results in the production of a 2-aminomethyl-indane compound with continued, though somewhat weakened central nervous system stimulating action, namely the new 2-aminomethyl-$\Delta^2$-indene of the present invention having the following structural formula:

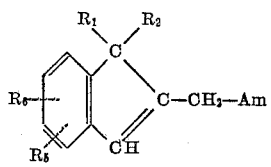

wherein $R_1$, $R_2$, Am, $R_5$ and $R_6$ have the same definitions as above.

It has further been found according to the present invention that a still further change in the molecule of the original 2-aminomethyl-indanone-(3) starting material or the 2-aminomethyl-indanol-(3) or 2-aminomethyl-$\Delta^2$-indene of the present invention, namely the reduction thereof to the 2-aminomethyl-indane having the following structural formula:

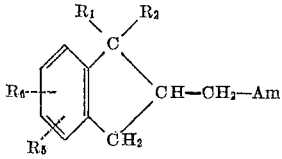

wherein $R_1$, $R_2$, Am, $R_5$ and $R_6$ have the same definitions as above, results in a product which surprisingly has equally interesting pharmacological properties as the other products of the present invention. The new 2-aminomethyl-indane of the present invention has a spasmolytic action as well as a strong central nervous system stimulating action.

As previously indicated, the production of the new 2-aminomethyl-indane can be carried out either directly in a single step from the 2-aminomethyl-indanone-(3) or indirectly in several steps with the production of the valuable intermediary products of the present invention obtained by the treatment of 2-aminomethyl-indanone-(3), namely 2-aminomethyl-indanol-(3) and 2-aminomethyl-$\Delta^2$-indene.

The direct process according to the present invention proceeds preferably by the catalytic hydrogenation of the 2-aminomethyl-indanone-(3) in the presence of a strong acid such as sulfuric acid or perchloric acid or the like which in this reaction probably takes the role of a dehydrating agent, the reaction preferably being carried out utilizing a noble metal catalyst.

The indirect reaction can proceed in either of two ways: (a) by further reduction of the 2-aminomethyl-indanol-(3) (preferably by catalytic hydrogenation in the same manner as referred to above in the direct method for the conversion of 2-amino-methyl-indanone-(3)); or (b) by subjecting the 2-aminomethyl-$\Delta^2$-indene to a further reduction preferably utilizing Raney nickel as catalyst. According to the indirect method (a) the 2-aminomethyl-indanol-(3) which is utilized is preferably obtained from the corresponding 2-aminomethyl-indanone-(3) by the method described above. According to the indirect method (b), the 2-aminomethyl-$\Delta^2$-indene which is utilized is preferably obtained from the corresponding 2-aminomethyl-indanol-(3) by the method described above.

It is also possible according to the present invention to produce the 2-aminomethyl-indane by the reduction of the corresponding 2-aminomethyl-$\Delta^1$-indene [1] instead of the reduction of the 2-aminomethyl-$\Delta^2$-indene, similarly to the method described above for the 2-aminomethyl-$\Delta^2$-indene.

All hydrogenations according to the present invention are preferably carried out in organic solvent solution, e. g. in a methanol solution.

The following examples are given as illustrative of the present invention, the scope of the invention not however being limited to the specific details of the examples.

*Example 1*

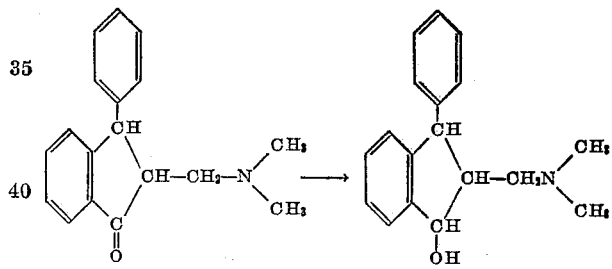

3 g. of 1-phenyl-2-dimethylaminomethyl-indanone-(3)-hydrochloride, produced from 1-phenyl-indanone-(3) by a Mannich reaction with formaldehyde and dimethylaminohydrochloride, is hydrogenated in 100 cc. of methanol with the addition of 3 cc. of concentrated hydrochloric acid under normal conditions and utilizing palladium carbon as catalyst. The hydrogen taken up amounts to 1 mol of $H_2$ within 3 hours. After suctioning off of the catalyst the volume is reduced in vacuum under a nitrogen atmosphere. The residue is taken up in water and filtered over carbon. The base is then set free with bicarbonate solution and extracted with chloroform. After drying over potash the chloroform solution is evaporated. The raw base is recrystallized from methanol-water. The melting point of the base is 110–112° C. and of the hydrochloride is 235.5° C.

*Example 2*

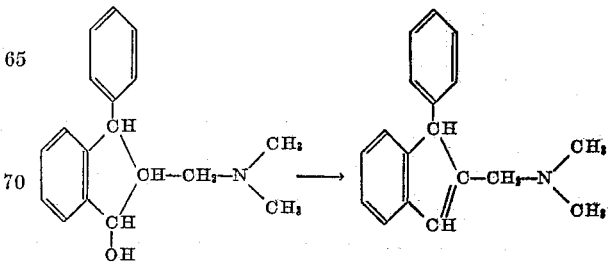

---
[1] Cf. Helv. Chim. Acta, vol. 27, page 1782.

1.2 g. of 1-phenyl-2-dimethylaminomethyl-indanol-(3)-hydrochloride is mixed with 12 cc. of glacial acetic acid and 4 cc. of concentrated hydrochloric acid and the mixture is cooked with refluxing for 30 minutes. The hydrochloric acid as well as the acetic acid is evaporated off vacuum with the protection of a nitrogen atmosphere. The residue is taken up with water and filtered over carbon. The base is set free with bicarbonate solution and is taken up in ether. The ether solution is dried with potash and the hydrochloride is subsequently precipitated by the addition of ethereal hydrochloric acid. The thus obtained 1-phenyl-2-dimethylaminomethyl-Δ²-indene-hydrochloride is again precipitated from methanol-ether and is found to have a melting point of 160–162° C.

*Example 3*

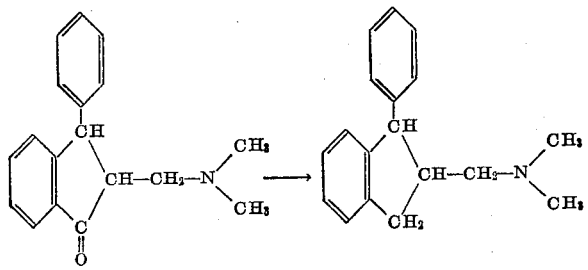

12 g. of 1-phenyl-2-dimethylaminomethyl-indanone-(3)-hydrochloride in 180 cc. of glacial acetic acid and 10 g. of 85% sulfuric acid is hydrogenated under normal pressure at 60° C. with palladium black as catalyst. The hydrogenation is completed after 2 mols of hydrogen is taken up. The catalyst is suctioned off and the sulfuric acid is neutralized with potash under cooling. The volume is then reduced in vacuum under the protection of nitrogen. The residue is taken up in water and filtered over carbon. The base is set free by the addition of potash solution and subsequently taken up in ether. After drying over potassium carbonate the hydrochloride of 1-phenyl-2-dimethylaminomethyl-indane is precipitated by the addition of ethereal hydrochloric acid. The raw product is again precipitated from methanol-ether and the obtained product is found to have a melting point of 175° C.

*Example 4*

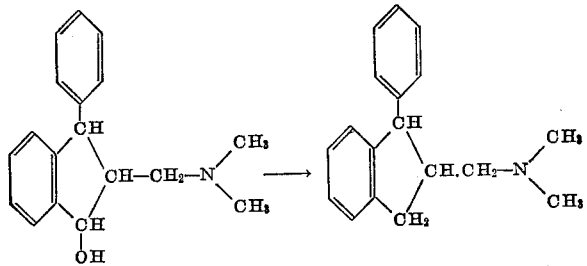

6.1 g. of 1-phenyl-2-dimethylaminomethyl-indanol-(3)-hydrochloride in 30 cc. of glacial acetic acid and 5 cc. of sulfuric acid is hydrogenated under normal pressure at a temperature of 60° C. utilizing palladium black as catalyst. After 2 hours the amount of hydrogen taken up is 1 mol of H₂. The catalyst is suctioned off and the sulfuric acid neutralized with potash under cooling. The volume is then reduced in vacuum under the protection of nitrogen. The residue is taken up in water and filtered over carbon. The base is then set free by the addition of potash solution and is taken up in ether. After drying over potassium carbonate, the hydrochloride of 1-phenyl-2-dimethylaminomethyl-indane is precipitated by the addition of ethereal hydrochloric acid. The raw product is again precipitated from methanol-ether and the resulting product has a melting point of 175° C.

*Example 5*

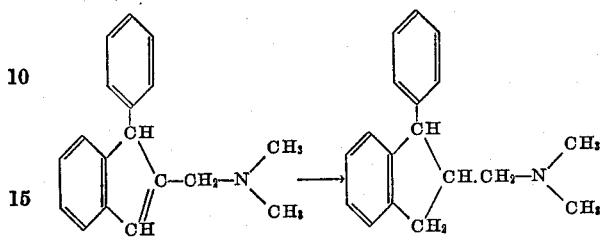

5 g. of 1 - phenyl - 2 - dimethylaminomethyl - Δ² - indene-hydrochloride in methanol solution is hydrogenated at room temperature and under normal pressure utilizing palladium black as catalyst. After the hydrogen absorption has ended the catalyst is separated from the reaction mixture and the volume of the reaction mixture is reduced in vacuum under the protection of nitrogen. The residue is taken up with water and filtered over carbon. The base is then set free with bicarbonate solution and is extracted with ether. After drying over potassium carbonate, the hydrochloride of 1-phenyl-2-dimethylaminomethyl-indane is precipitated by the addition of ethereal hydrochloric acid. The raw product is again precipitated from methanol-ether and the resulting product has a melting point of 173–174° C.

*Example 6*

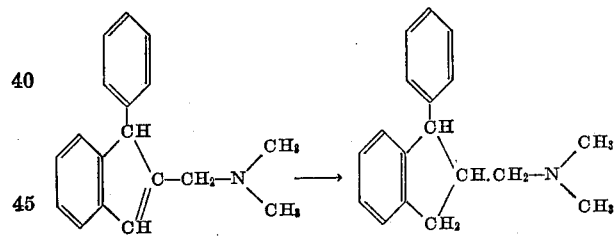

5 g. of 1-phenyl-2-dimethylaminomethyl-Δ²-indene-hydrochloride in methanol solution is hydrogenated at room temperature and under normal pressure with neutral washed Raney nickel as catalyst. After the hydrogen absorption has ended the reaction mass is separated from the catalyst and the volume is reduced in vacuum under the protection of nitrogen. The residue is taken up with water and filtered over carbon. The base is set free with bicarbonate solution and then extracted with ether. After drying over potassium carbonate the hydrochloride of 1-phenyl-2-dimethylaminomethyl-indane is precipitated by the addition of ethereal hydrochloric acid. The raw product is again precipitated from methanol-ether and the resulting product has a melting point of 173–174° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. As a new composition of matter, 1-phenyl-2-dimethylaminomethyl-indanol-(3).

2. The hydrochloride addition products of the compound of claim 1.

References Cited in the file of this patent

UNITED STATES PATENTS

| | | |
|---|---|---|
| 2,441,069 | Hoffmann et al. | May 4, 1948 |
| 2,541,967 | Kolloff et al. | Feb. 13, 1951 |
| 2,625,567 | Heinzelmann | Jan. 13, 1953 |

OTHER REFERENCES

Braun et al.: Berichte 49, 2642–54 (1916).
Hoffmann et al.: "Helv. chim. Acta" (1944), vol. 27, pp. 1782–8.